US011069997B1

(12) United States Patent
Taylor et al.

(10) Patent No.: US 11,069,997 B1
(45) Date of Patent: Jul. 20, 2021

(54) HIGH-POWER ELECTRICAL FEEDER CONNECTOR

(71) Applicant: Glenair, Inc., Glendale, CA (US)

(72) Inventors: Zachary W. Taylor, Paso Robles, CA (US); Robert T. Johnson, Cave Creek, AZ (US); Daniel M. Mitchell, Lake Forest, CA (US)

(73) Assignee: GLENAIR, INC., Glendale, CA (US)

( * ) Notice: Subject to any disclaimer, the term of this patent is extended or adjusted under 35 U.S.C. 154(b) by 0 days.

(21) Appl. No.: 16/900,896

(22) Filed: Jun. 13, 2020

(51) Int. Cl.
*H01R 33/22* (2006.01)
*H01R 13/20* (2006.01)
*H01R 13/53* (2006.01)
*H01R 4/30* (2006.01)
*H01R 4/64* (2006.01)
*H01R 43/04* (2006.01)
*H01B 1/02* (2006.01)

(52) U.S. Cl.
CPC .............. *H01R 13/20* (2013.01); *H01B 1/02* (2013.01); *H01R 4/307* (2013.01); *H01R 4/64* (2013.01); *H01R 13/53* (2013.01); *H01R 43/04* (2013.01)

(58) Field of Classification Search
CPC .. H01R 24/58; H01R 23/7073; H01R 23/688; H01R 2103/00; H01K 1/46
USPC .......... 439/668, 667, 79, 947, 108, 188, 339
See application file for complete search history.

(56) References Cited

U.S. PATENT DOCUMENTS

| 9,601,856 | B2* | 3/2017 | Regantini | H01R 13/11 |
|---|---|---|---|---|
| 10,348,037 | B2* | 7/2019 | Hie | H01R 13/631 |
| 2009/0197476 | A1* | 8/2009 | Wallace | H01R 9/15 439/694 |
| 2019/0356061 | A1* | 11/2019 | Masuda | H01R 9/0518 |

* cited by examiner

Primary Examiner — Phuong Chi Thi Nguyen
(74) Attorney, Agent, or Firm — David S. Alavi

(57) ABSTRACT

An electrical connector includes conductive male and female contacts and insulating inner and outer sleeves, and connects first and second electrical wires end-to-end. The contacts can be attached to corresponding conductors of the first and second wires. The male contact includes an elongated pin; the female contact includes a receptacle. Inserting the pin into the receptacle results in mechanical engagement of, and electrical continuity between, the assembled contacts. The assembled contacts can be positioned within the compressible inner sleeve, which extends beyond the ends of the assembled contacts. The inner sleeve, with the assembled contacts therein, can be positioned within the rigid outer sleeve, which extends at least as far as the inner sleeve. Compression of the inner sleeve by the ends of the outer sleeve frictionally engages the ends of the inner sleeve with the corresponding wires.

27 Claims, 8 Drawing Sheets

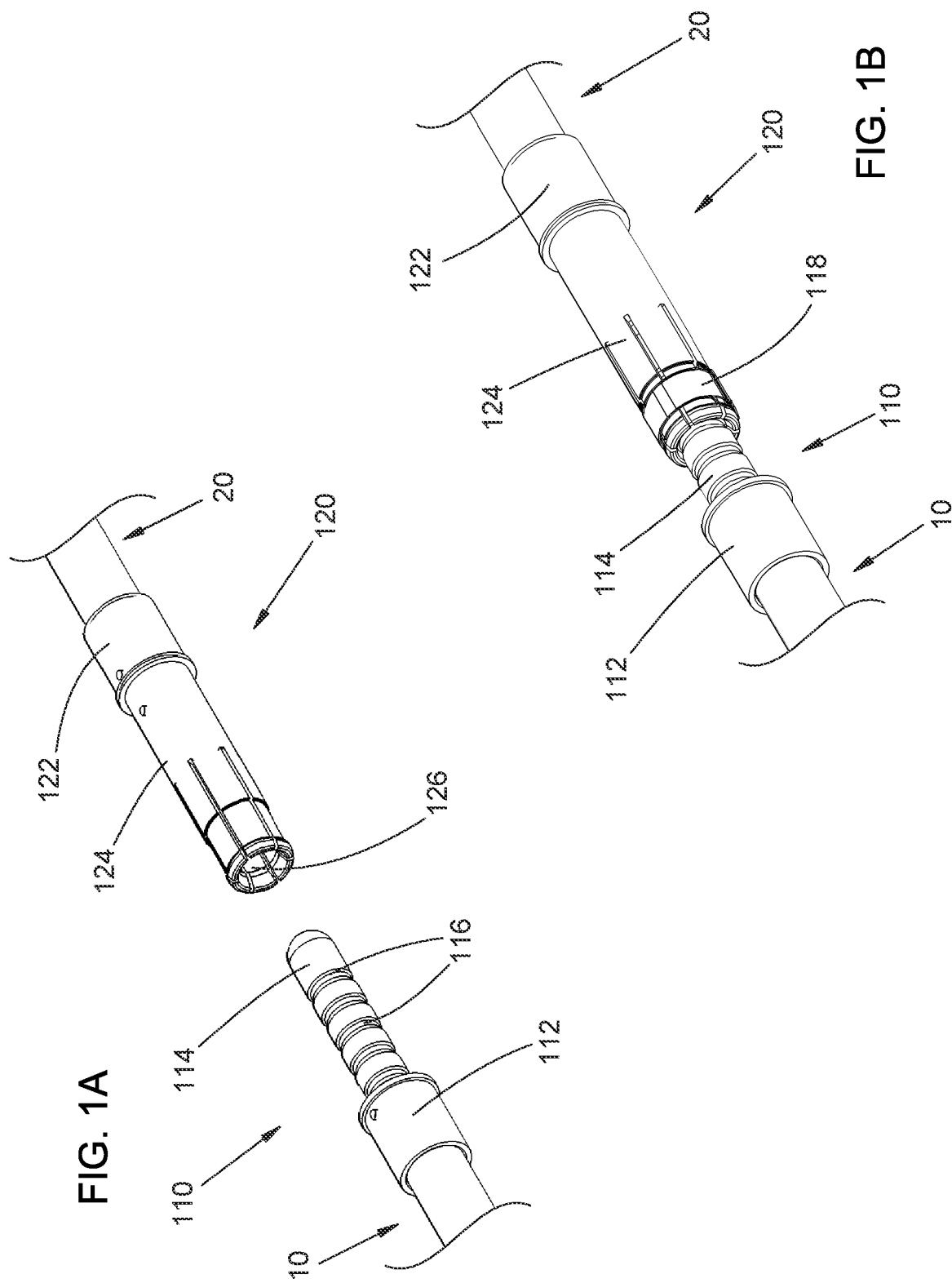

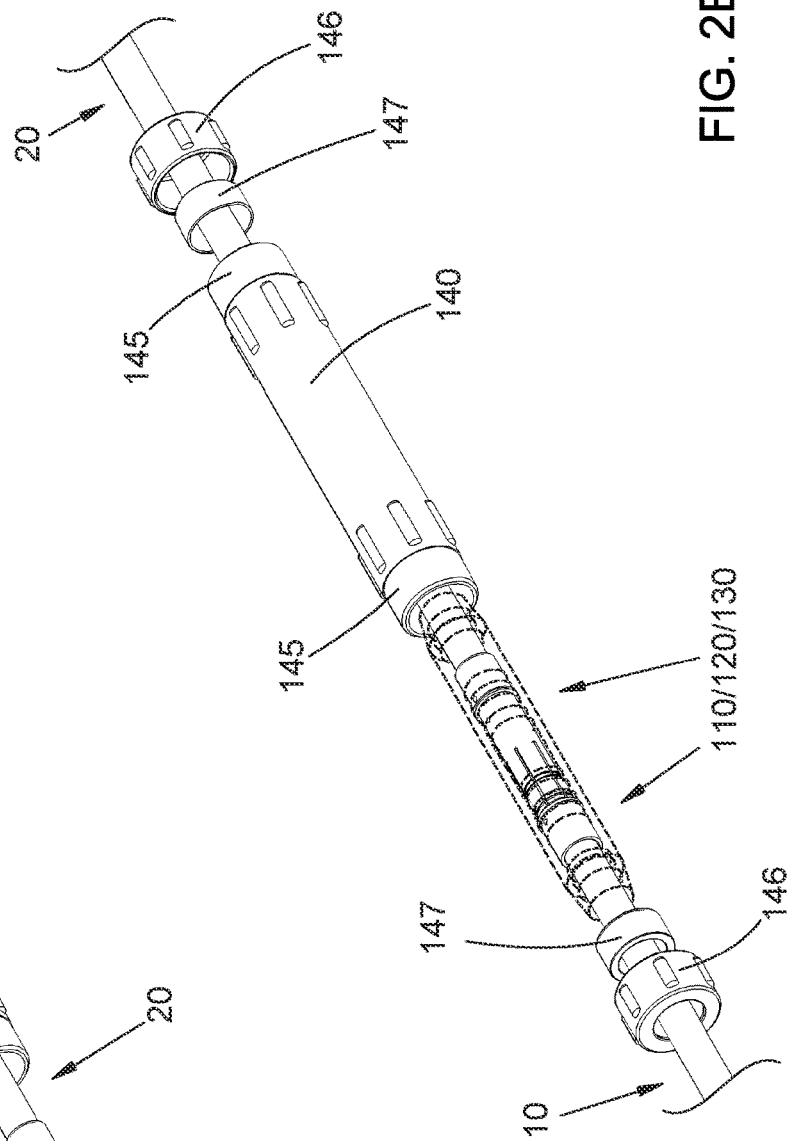
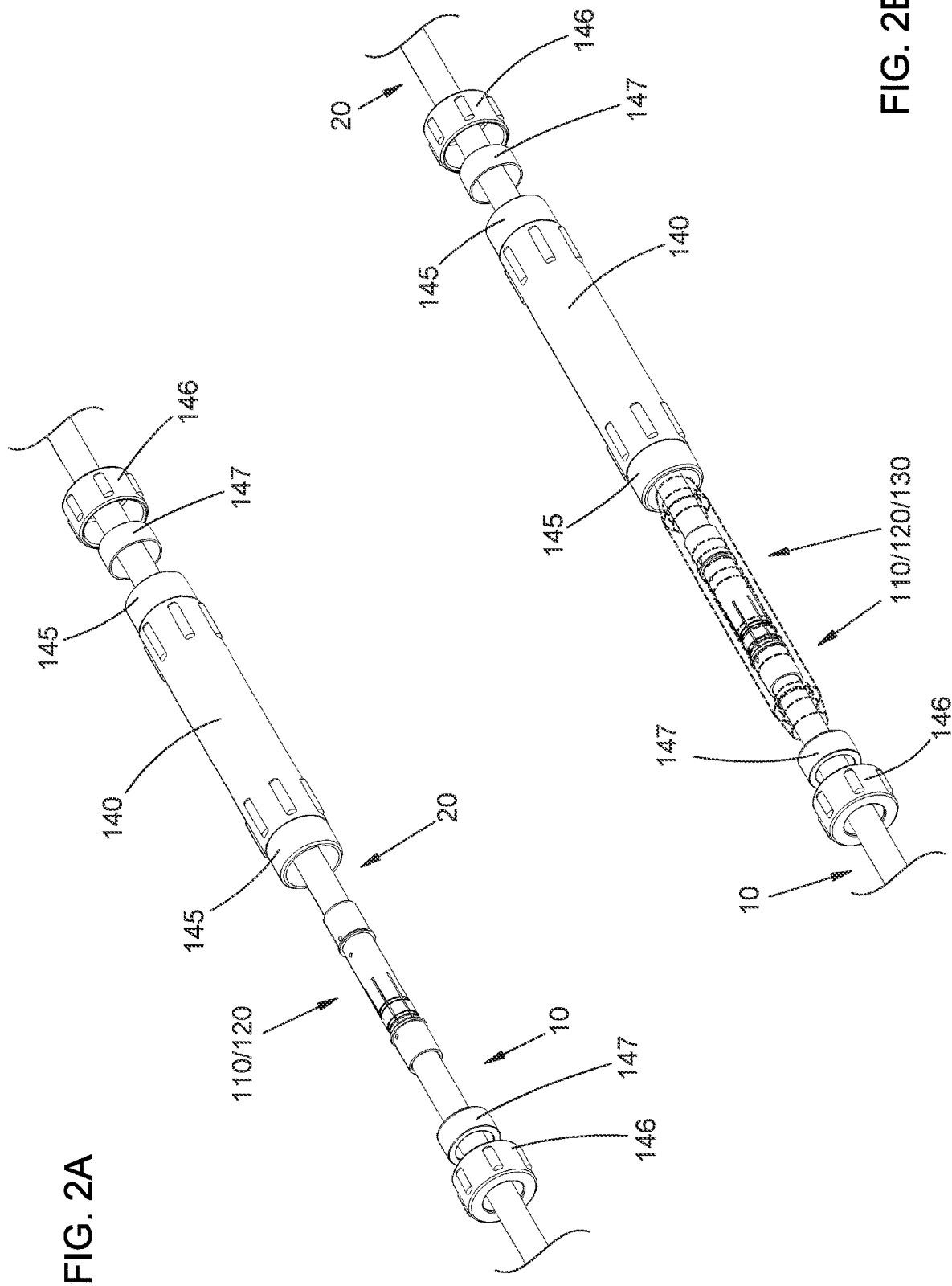
FIG. 2A
FIG. 2B

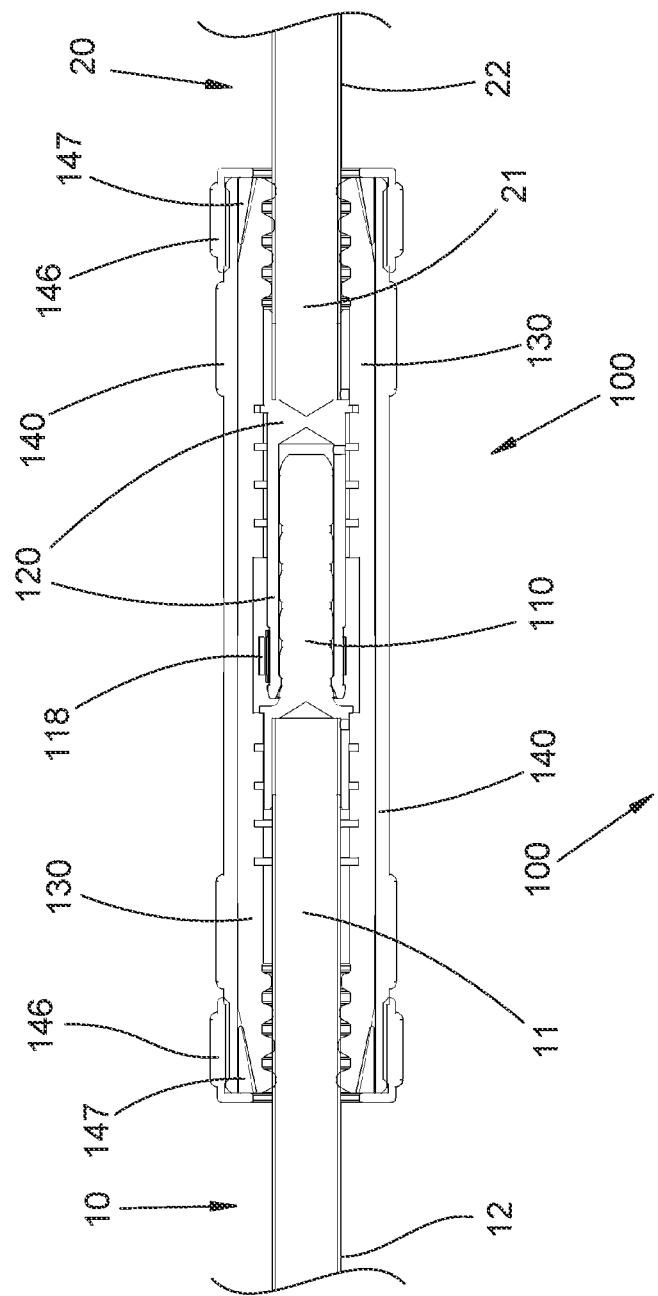
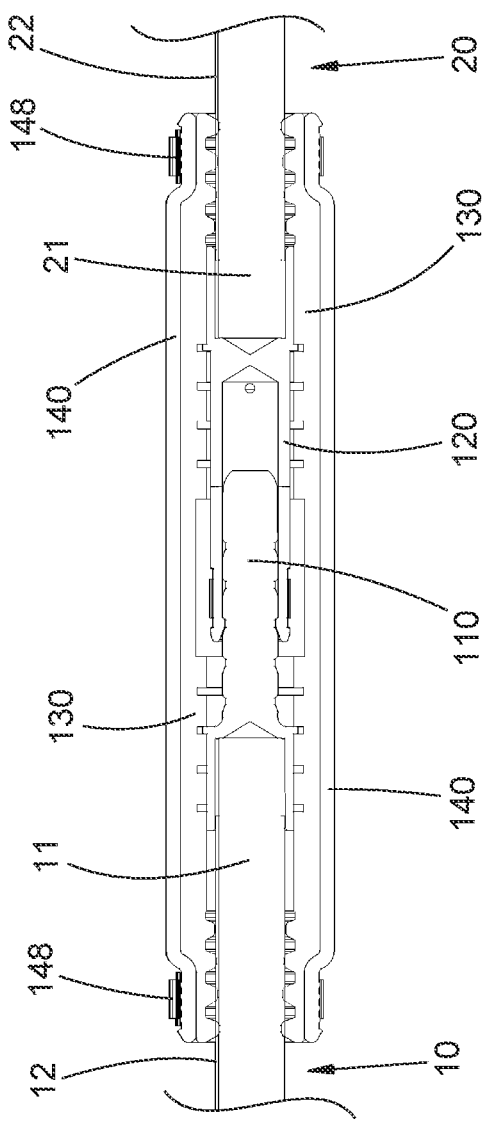

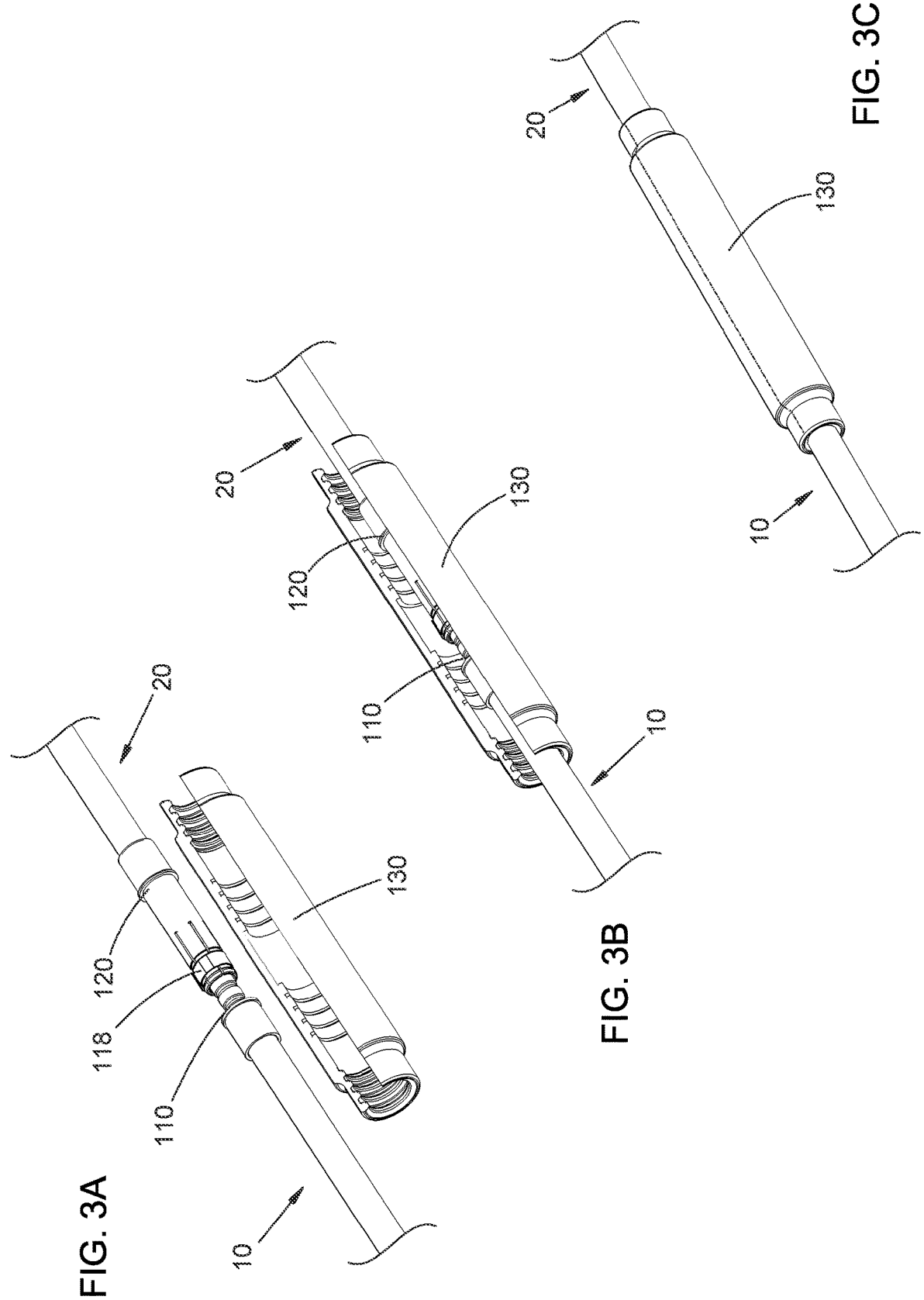

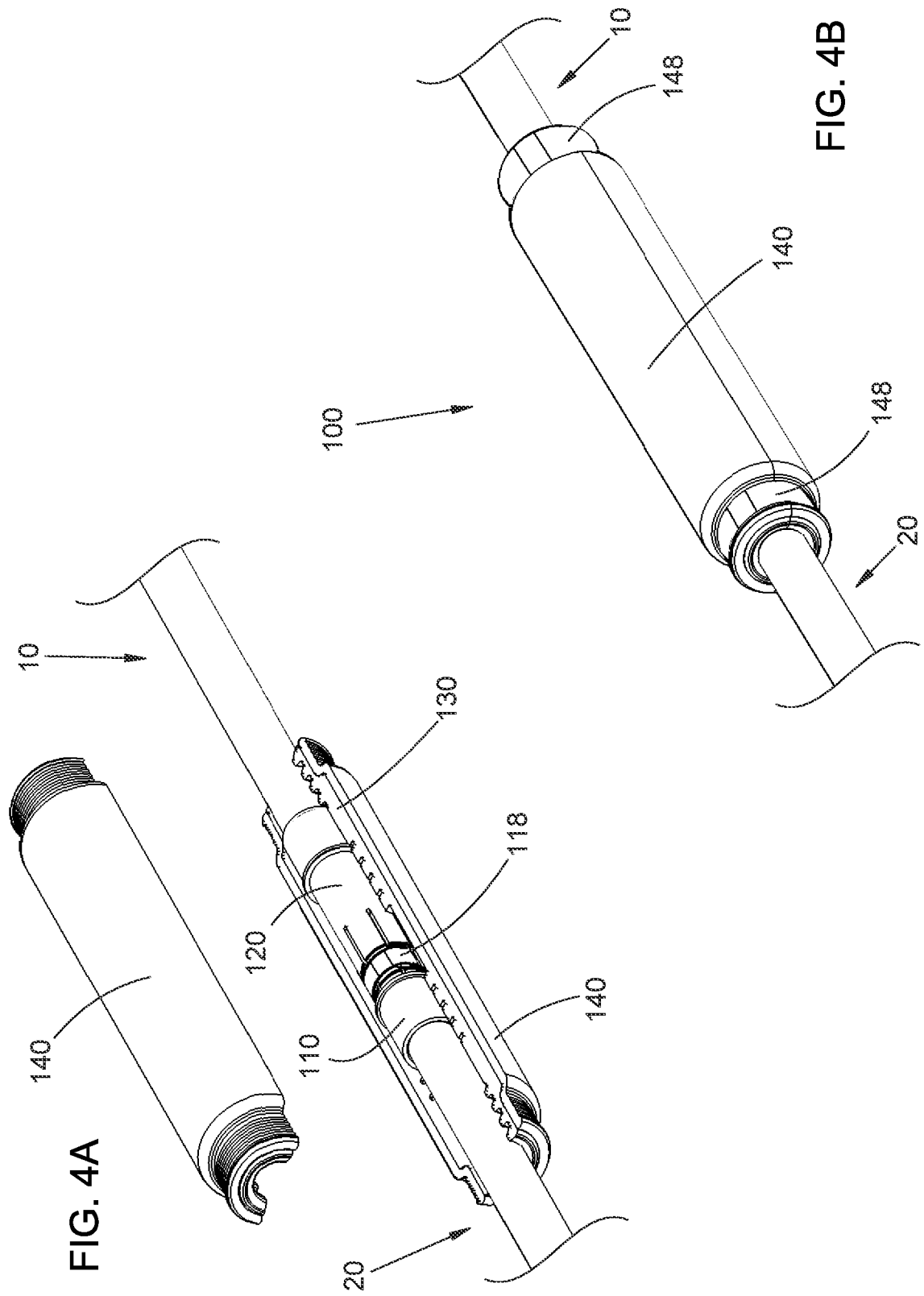

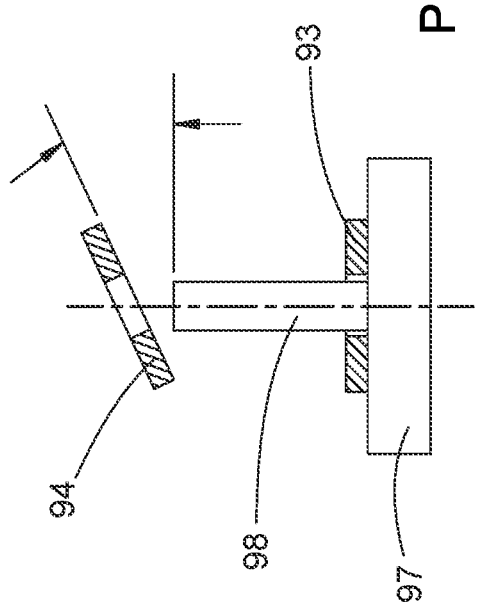
FIG. 6B
PRIOR ART
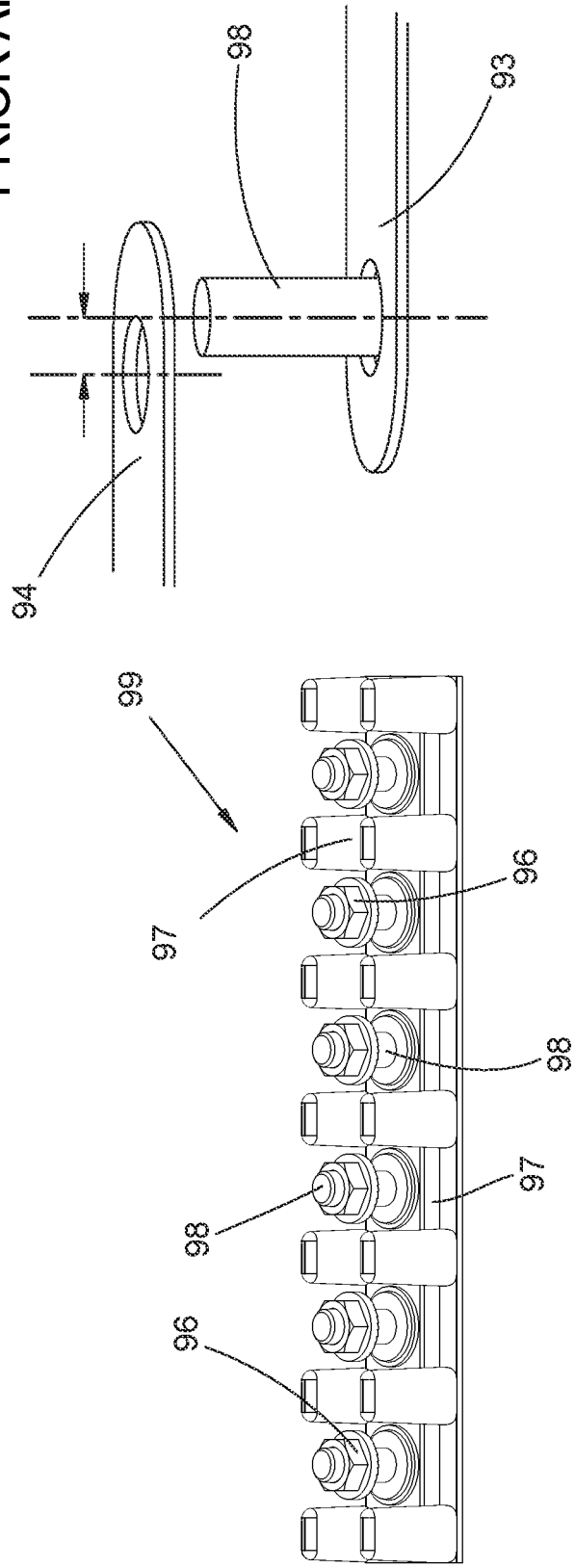
FIG. 6A
PRIOR ART
FIG. 6C
PRIOR ART

HIGH-POWER ELECTRICAL FEEDER CONNECTOR

FIELD OF THE INVENTION

The field of the present invention relates to high-power electrical feeders. In particular, high-power electrical feeder connectors are disclosed applicable for, e.g., high-power connections between electrical generators in an aircraft and the aircraft's power distribution system.

BACKGROUND

Some aspects of an example of a conventional high-power electrical feeder connector assembly 99 are illustrated schematically in FIGS. 6A-6B. "High-power" can include electrical currents of up to several tens of amperes, e.g., up to 50 A or more, at voltages up to several hundred volts. The conventional arrangement shown is commonly employed for high-power feeder connections between, e.g., an aircraft electrical power distribution network and its electrical generators, or between prefabricated and prewired wing or fuselage segments. For example, power generation often occurs within the housings of jet engines, and that power must make its way into the aircraft fuselage to be distributed for use. Engines are often demounted from the aircraft for maintenance or replacement, so electrical connections are employed that can be made, unmade, and remade. In the conventional arrangement shown, one or more threaded terminal studs 98 protrude from an electrically insulating block or strip 97. Corresponding first and second wires are terminated with terminal lugs 93 and 94, respectively. To connect a given pair of the wires, their corresponding lugs 93/94 are placed over one of the studs 98, and a nut 96 threadedly engaged with the studs is tightened to press the lugs 93/94 together. In some instances an insulating cover or hood is placed over the studs 98 after all the wires are connected. That cover or hood often does not fully enclose conductive portions of the connector assembly 99, creating a potential safety hazard. Unobstructed paths through an ambient atmosphere can allow arcing to occur. If lengths of the wires are slightly wrong (e.g., as in FIG. 6B), undesirable forces might be applied to the wires, lugs 93/94, studs 98, or block 97. If the lugs 93/94 are not properly aligned with the corresponding studs 98 (e.g., as in FIG. 6C), undesirable torques might be applied to the wires, lugs 93/94, studs 98, or block 97.

SUMMARY

An inventive electrical connector includes male and female contacts, an inner sleeve, and an outer sleeve, and can be used for connecting first and second insulated electrical wires end-to-end. The electrically conductive male contact includes a rearward portion that can be attached to an electrical conductor of the first wire protruding from its insulation, and a forward portion that includes an elongated pin. The electrically conductive female contact includes a rearward portion that can be attached to an electrical conductor of the second wire protruding from its insulation, and a forward portion that includes an elongated receptacle. Insertion of the pin into the receptacle results in mechanical engagement of, and electrical continuity between, the assembled male and female contacts. The assembled male and female contacts can be positioned within a longitudinal passage through, and enclosed circumferentially by, the electrically insulating, compressible inner sleeve, which extends in both longitudinal directions beyond the ends of the assembled male and female contacts. The inner sleeve, with the assembled male and female contacts positioned therein, can be positioned within a longitudinal passage through, and enclosed circumferentially by, the electrically insulating, substantially rigid outer sleeve, which extends in both longitudinal directions at least as far as the inner sleeve. The outer sleeve can compress a first end of the inner sleeve to frictionally engage the first wire, and can compress a second end of the inner sleeve so as to frictionally engage the second wire.

An inventive method for connecting the first and second insulated conductive wires end-to-end, using an inventive electrical connector, includes: (A) with the male and female contacts attached to the conductors of the respective first and second wires, assembling the male and female contacts by inserting the pin into the receptacle, thereby engaging the pin with the receptacle and establishing electrical continuity between the male and female contacts; (B) positioning the assembled male and female contacts within the inner sleeve; (C) positioning the inner sleeve, and the assembled male and female contacts positioned therein, within the outer sleeve; and (D) at the ends of the outer sleeve, compressing corresponding ends of the inner sleeve to frictionally engage the corresponding wires. The inventive method can further include (i) attaching the rearward portion of the male contact to the conductor of the first wire protruding from its insulation, and (ii) attaching the rearward portion of the female contact to the conductor of the second wire protruding from its insulation.

Objects and advantages pertaining to electrical connectors may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1A and 1B illustrate schematically assembly of male and female contacts in an example of an inventive electrical connector.

FIGS. 2A through 2D illustrate schematically assembly of a first example embodiment of an inventive electrical connector; FIG. 2E is a schematic cross section of the assembled example embodiment.

FIGS. 3A through 3C illustrate schematically an example of positioning assembled male and female contact within an insulating inner sleeve of an inventive electrical connector.

FIGS. 4A and 4B illustrate schematically assembly of a second example embodiment of an inventive electrical connector; FIG. 4C is a schematic cross section of the assembled example embodiment.

FIGS. 6A through 6C illustrate schematically various aspects of conventional terminal stud/lug connectors.

Figure 2D:
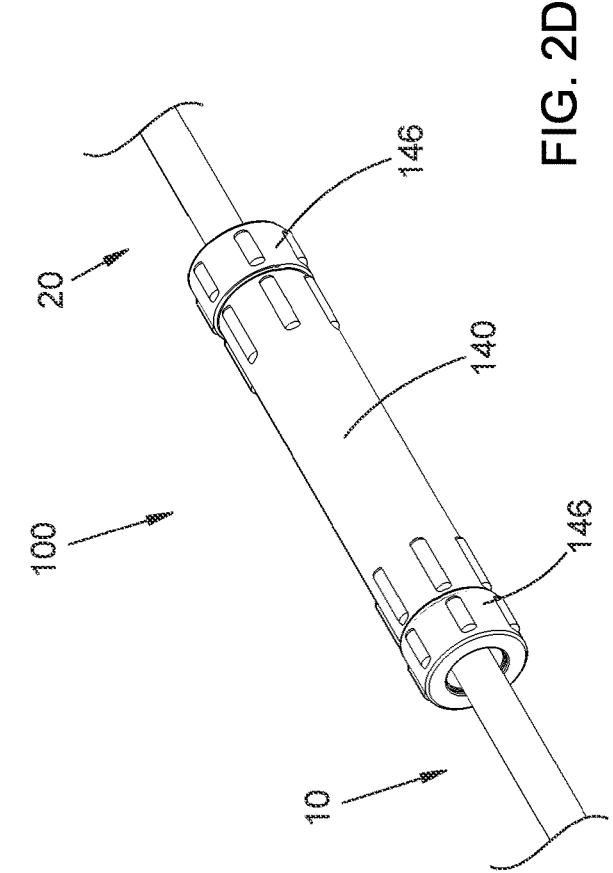
Figure 2C:
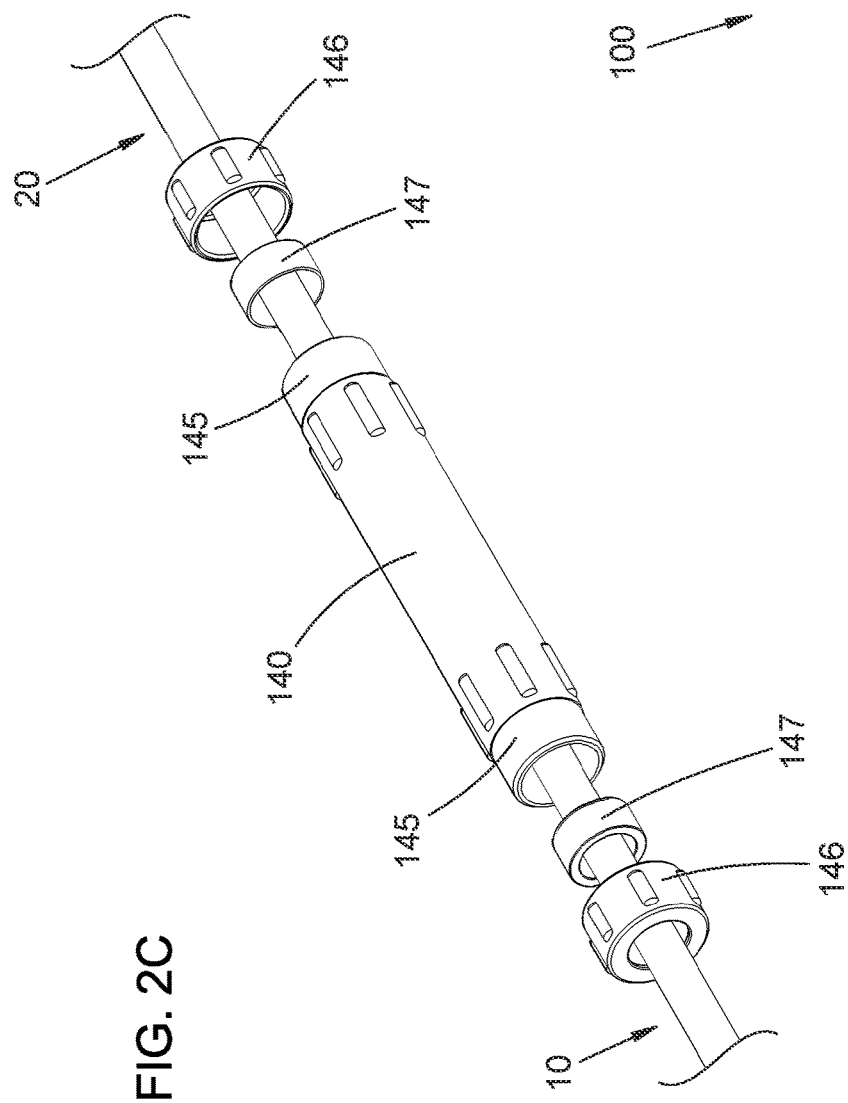

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION OF EMBODIMENTS

Examples of inventive electrical connector assemblies 100 (also referred to herein as electrical connectors 100) are illustrated schematically in FIGS. 1A, 1B, 2A-2E, 3A-3C, 4A-4C. The inventive electrical connector assemblies 100 can be used to connect an end of a first insulated electrical wire 10 to and end of a second insulated electrical wire 20. An inventive electrical connector assembly comprises an electrically conductive male contact 110, an electrically conductive female contact 120, an insulating, compressible inner sleeve 130, and an insulating, substantially rigid outer sleeve 140.

The male and female contacts 110/120 can include any one or more suitable electrically conductive materials, e.g., one or more metals or metal alloys. In some examples the contacts 110/120 can include copper or aluminum. One examples of suitably arranged male and female contacts 110/120 is shown in FIGS. 1A and 1B. The male contact 110 includes a rearward wire-engaging portion 112 and a forward portion including an elongated pin 114. The rearward portion 112 is structurally arranged in any suitable way to be attached to an electrical conductor 11 protruding from insulation 12 at the end of the first wire 10. The female contact 120 includes a rearward wire-engaging portion 122 and a forward portion including an elongated receptacle 124. The rearward portion 122 is structurally arranged in any suitable way to be attached to an electrical conductor 21 protruding from insulation 22 at the end of the first wire 20. The rearward portions 112/122 can be arranged to accommodate any suitable conductor size; in some various examples the rearward portions 112/122 can be arranged to accommodate conductors from about ¼ of an inch to about ¾ of an inch in diameter. In some examples, the rearward contact portions 112/122 can be arranged as cavities for receiving the corresponding conductors 11/21, which can be attached to the contacts 110/120 by crimping the rearward portions 112/122 (with or without soldering), by soldering (with or without crimping), or in any other suitable way. Insertion of the pin 114 into the receptacle 124 establishes mechanical engagement and electrical continuity between the assembled male and female contacts 110/120 and also, with the contacts 110/120 attached to the wires 11/21, between the conductors 11/21 of the wires 10/20.

The inner sleeve 130 (e.g., as in FIGS. 2B, 2E, 3A-3C, 4A, and 4C) has a central longitudinal passage therethrough that encloses circumferentially the assembled male and female contacts 110/120, and enabling the wires 10/20 to pass through the ends of the inner sleeve 110 to reach the respective contacts 110/120. The inner sleeve 130 extends, with the assembled contacts 110/120 positioned therein, in both longitudinal directions beyond the respective rearward portions 112/122 of the assembled contacts 110/120. In many examples, the inner sleeve 130 extends over a portion of the insulation 11/21 of the wires 10/20, so that conductors 12/22 of the wires 10/20 and the contacts 110/120 of the connector assembly 100 are all enclosed by the electrically insulating material of the inner sleeve 130, reducing potential arcing or safety hazards. The outer sleeve 140 has a central longitudinal passage therethrough for receiving therein, and enclosing circumferentially, the inner sleeve 130 and the assembled contacts 110/120 positioned within the inner sleeve 130. The outer sleeve 140 extends, with the inner sleeve 130 and the assembled contacts positioned therein, in both longitudinal directions at least as far as the inner sleeve 130. Each end of the outer sleeve 140 is structurally arranged to compress a corresponding end of the inner sleeve 130. Compression of the first end of the inner sleeve 130 results in frictional engagement between the inner sleeve 130 and the first wire 10; compression of the second end of the inner sleeve 130 results in frictional engagement between the inner sleeve 130 and the second wire 20.

In some examples, engagement of the ends of the inner sleeve 130 with the wires 10/20 can also serve to seal off the interior passage through the inner sleeve 130 and thereby isolate the assembled contacts 110/120 from a use environment. Such isolation can be advantageous in use environments wherein the wires 10/20 and the connector assembly 100 are exposed to, e.g., water, humidity, chemical contaminants, and so forth. In some examples the outer surface of the inner sleeve 130 can be tapered at each end; the taper can facilitate compression of the ends of the inner sleeve 130 by the outer sleeve 140. In some examples the inner sleeve 130 can include a plurality of circumferential flanges extending radially inward that can engage the assembled contacts 110/120 positioned within the inner sleeve 130; that flanged arrangement can in some instances facilitate insertion of the assembled contacts 110/120 into the inner sleeve 130, or accommodate compression of the inner sleeve 130 by the outer sleeve 140.

The electrically insulating, compressible inner sleeve 130 can include any one or more suitable materials. In some examples one or more polymeric materials can be employed, e.g., one or more elastically or plastically deformable polymeric materials such as silicone or fluorosilicone polymers, polytetrafluoroethylene polymers (PTFE), polyethylene polymers, polyethylene terephthalate polymers (PET), ethylene propylene diene monomer rubbers (EPDM rubbers), and so forth; in some examples Duralectric™ material can be employed. The electrically insulating, substantially rigid outer sleeve 140 can include any one or more suitable materials. In some examples one or more polymeric materials can be employed, e.g., one or more substantially rigid or only negligibly deformable polymeric materials such as silicone or fluorosilicone polymers, polytetrafluoroethylene polymers (PTFE), polyethylene polymers, polyethylene terephthalate polymers (PET), polyether ether ketone polymers (PEEK), polyetherketone polymers (PEK), other polyaryletherketone polymers (PAEK), polyethylenimine polymers (PEI), polyphenylene sulfide polymers, and so forth; in some examples polyether ether ketone (PEEK) material can be employed. In some examples, one or both of the inner and outer sleeves 130/140 can include one or more materials that are resistant (physically or chemically) to fluids (liquids or gases) present in a use environment. In some examples, one or both of the inner and outer sleeves 130/140 can be resistant to one or more aviation fluids (e.g., engine or turbine oils, lubricants, refrigerants, antifreezes or deicers, fire suppressing or extinguishing materials, hydraulic fluids, coolants, cleaners, organic solvents, alcohols, water, and so forth). In some examples, the inner and outer sleeves 130/140 can include materials that can tolerate extremes of temperature (e.g., −110° C. to 200° C., or up to 260° C.), air pressure (e.g., near vacuum to over one or two or more atmospheres), or humidity.

In conventional connector arrangements (e.g., as in FIGS. 6A-6C) that include a terminal lug on each wire connected to a common terminal stud on a terminal strip, the terminal lug on a wire may not be properly aligned with the terminal stud on a mounted terminal strip (e.g., as in FIG. 6C). The wire must be twisted to make the connection, leaving undesirable residual torque on the wire, lug, stud, and terminal strip after the connection is made. In some examples of an inventive connector assembly, the male and female contacts 110/120 can rotate relative to one another about a longitudinal axis while the pin 114 is received within and mechanically engaged with the receptacle 124. In the examples shown, the pin 114 and receptacle 124 are cylindrically symmetric, which allows relative rotation while maintaining mechanical engagement and electrical continuity. No twisting of the wires 10/20 is needed to connect them using an inventive electrical connector 100 arranged thus.

In some instances, there can be variation in the lengths of the wires 10/20. If too short (e.g., as in FIG. 6B), a terminal lug may not reach the corresponding terminal stud (in which the desired connection cannot be made), or might reach only by stretching the wire (leaving undesirable residual tension on the wire, lug, stud, and terminal strip). If too long, the wire must be bent to make the desired connection (leaving undesirable force on the wire, lug, stud, and terminal strip, or causing mechanical interference with adjacent structures such as adjacent wires). In some examples of an inventive connector assembly 100, one or both of the pin 114 or the receptacle 124 are structurally arranged to retain the pin 114 within the receptacle 124 at any one of multiple relative longitudinal positions, so that the male and female contacts 110/120 can translate relative to one another along the longitudinal axis while the pin 114 is received within and mechanically engaged with the receptacle 114. No bending of the wires 10/20 is needed to connect them using an inventive electrical connector 100 arranged thus.

In some examples (not shown) the pin 114 and the receptacle 124 can slide along each other and engage one another over a continuous range of relative longitudinal positions (e.g., a smooth pin 114 frictionally engaged within a smooth-bore receptacle 124). In some examples, including those shown in the drawings, the pin and receptacle 114/124 can be arranged to engage one another at a set of distinct relative longitudinal positions. In some examples, the pin 114 can include multiple circumferential grooves 116 on its outer circumferential surface that are spaced longitudinally from one another along the pin 114. In such examples the receptacle can include a circumferential ridge 126 extending radially inward within the receptacle 124; the ridge 126 can engage any one of the circumferential grooves 116 of the pin 114 with the pin 114 within the receptacle 124. The receptacle 124 can be elastically deformable and structurally arranged (e.g., by inclusion of one or more longitudinal relief cuts, as in the examples shown) so that, with the ridge 126 aligned with one of the grooves 116, the ridge 126 is urged into engagement the aligned groove 116 and the receptacle 124 frictionally engages the pin 114. With longitudinal force applied, the receptacle 124 permits the ridge 126 to disengage from the aligned groove 116 and slide along the pin 114 as the pin 114 moves longitudinally within the receptacle 124. Upon reaching alignment with another groove 116, the ridge 126 can be urged into engagement with that groove 116 by the receptacle 124.

To provide a more robust connection between the wires 10/20, in some examples the connector 100 can include an inner band 118 positioned around the receptacle 124 (e.g., as in FIGS. 1B, 2E, 3A, and 4A). With the male and female contacts 110/120 assembled together and with the inner band 118 under tension, the inner band 118 compresses the receptacle 124 against the pin 114. That compression can (i) improve the quality of the electrical connection between the contacts 110/120 (i.e., reduce the resistance across the engaged contacts), (ii) create or increase the force of frictional engagement between the pin and receptacle 114/124, or (iii) prevent disengagement of a ridge 126 (if present) from a groove 116 (if present). Elastic deformation or structural arrangement (e.g., one or more longitudinal relief cuts, as in the examples shown) can facilitate the compression of the receptacle 124 by the inner band 118. The inner band 118 can be of any suitable type or arrangement (e.g., secured with a crimped-on buckle), and can include any one or more suitable materials (e.g., one or more metals or metal alloys). In some examples, the receptacle can include a circumferential recessed area on its outer surface arranged for receiving the inner band 118. Such a recessed area can guide proper placement of the inner band 118, or can reduce or eliminate an increased transverse size of the assembled contacts 110/120 created by the presence of the inner band 118. In some examples that include an inner band 118, to disconnect the wires 10/20 by removing the pin 114 from the receptacle 124, the inner band 118 would be loosened or removed to enable removal of the pin 114 from the receptacle 124, and replaced and retightened if the wires 10/20 were reconnected by reinsertion of the pin 114 into the receptacle 124. In other examples that include an inner band 118, the band 118 would be cut off or otherwise damaged or destroyed by its removal from the receptacle 124, and replaced with a new inner band 118 if the wires 10/20 were reconnected by reinsertion of the pin 114 into the receptacle 124.

In some examples, the inner sleeve 130 can comprise a single, unitary, tubular member with openings only at its ends. In such an arrangement (not shown), one of the contacts 110/120 can be inserted all the way through the inner shield 130 and then slid farther along the corresponding wire 10/20 away from the contact prior to assembling the contacts 110/120. After assembling the contacts 110/120, the inner shield 130 can be slid back over the assembled contacts 110/120. In some examples (e.g., as in the example of FIGS. 3A-3C), a single longitudinal slice extends the entire length of a unitary, tubular inner sleeve 130, enabling lateral insertion of the assembled contacts 110/120 into the inner sleeve 130 through the slice. In some examples that include such a sliced arrangement, a self-healing polymeric material (e.g., Duralectric™) can be advantageously included in the inner sleeve 130; with the assembled male and female contacts 110/120 positioned within the inner sleeve 130, opposing surfaces of the slice can be joined by self-healing of the polymeric material.

In some examples, (e.g., as in the example of FIGS. 4A and 4B), the inner sleeve 130 can comprise a tubular member divided into two separate, opposing longitudinal segments. The two opposing segments can be assembled around the assembled contacts 110/120 to form the inner sleeve 130 with the assembled contacts 110/120 positioned therein. In some examples that include such an arrangement, a self-healing polymeric material (e.g., Duralectric™) can be advantageously included in the inner sleeve 130; with the assembled male and female contacts 110/120 positioned within the inner sleeve 130, opposing surfaces of the slice can be joined by self-healing of the polymeric material.

In some examples (e.g., as in the example of FIGS. 2A-2E), the outer sleeve 140 includes a unitary tubular member with openings only at its ends. In such an arrangement, one of the contacts 110/120 would be inserted all the way through the outer shield 140 and then slid farther along the corresponding wire 10/20 away from the contact prior to assembling the contacts 110/120. After assembling the contacts 110/120 and positioning them within the inner shield 130, the outer shield 140 can be slid back over the inner shield 130 with the assembled contacts 110/120 positioned therein. In some examples (e.g., as in the example of FIGS. 4A-4C), the outer sleeve 140 can comprise a tubular member divided into two separate, opposing longitudinal segments. Those two opposing segments can be assembled around inner sleeve 130, and the assembled contacts 110/120 positioned within the inner sleeve 130, to form the outer sleeve 140.

Whether the outer sleeve 140 includes a unitary tubular member or a pair of longitudinal segments, in some examples the outer sleeve 140 can further include first and second outer bands 148. The first outer band 148 can be positioned around a first end of the outer sleeve 140 and tensioned to compress the first end of the inner sleeve 130 and frictionally engage the inner sleeve 130 with the first wire 10. The second outer band 148 can be positioned around a second end of the outer sleeve 140 and tensioned to compress the second end of the inner sleeve 130 and frictionally engage the inner sleeve 130 with the second wire 20. The outer bands 148 can be of any suitable type, material, or arrangement, including those described above for the inner band 118. In some examples having outer bands 148, the ends of the outer sleeve 140 can include recessed circumferential areas or other suitable structural arrangements for guiding proper placement of the outer bands 148. In examples having outer bands 148 and a pair of longitudinal segments forming the outer sleeve 140 (e.g., as in the example of FIGS. 4A-4C), the tensioned outer bands 148 can also secure together the longitudinal segments of the outer sleeve 140. In examples having outer bands 148 and a unitary tubular outer sleeve 140 (not shown), the ends of the outer sleeve can be structurally arranged in any suitable way to enable compression of the inner sleeve 130, e.g., one or more longitudinal relief cuts at the ends of the outer sleeve 140.

Whether the outer sleeve 140 includes a unitary tubular member or a pair of longitudinal segments, in some examples the outer sleeve 140 can further include external threads 145 at the opposite first and second ends of the outer sleeve 140, first and second threaded nuts 146, and first and second compression glands 147 (e.g., as in FIGS. 2A-2E). The first wire 10 is inserted through the first nut 146 and the first gland 147, which are then slid away from the end of the first wire 10. Similarly, the second sire 20 is inserted through the second nut 146 and the second gland 147, which are then slid away from the end of the second wire 20. After inserting the pin 114 into the receptacle 124, positioning the assembled contacts 110/120 within the inner sleeve 130, and positioning the inner sleeve 130 and assembled contacts 110/120 within outer sleeve 140, the glands 147 are slid along their respective wires 10/20 and positioned against respective ends of the inner sleeve 130. Then the nuts 146 are slid along their respective wires 10/20 to threadedly engage the external threads 145 at respective ends of the outer sleeve 140. Tightening each of the nuts 146 urges the corresponding gland 147 against the inner sleeve 130, which compresses the inner sleeve 130 and frictionally engages the inner sleeve 130 with the wires 10/20. In examples having external threads 145 and a pair of longitudinal segments forming the outer sleeve 140 (not shown), the tightened nuts 146 can also secure together the longitudinal segments of the outer sleeve 140.

Figure 5A:
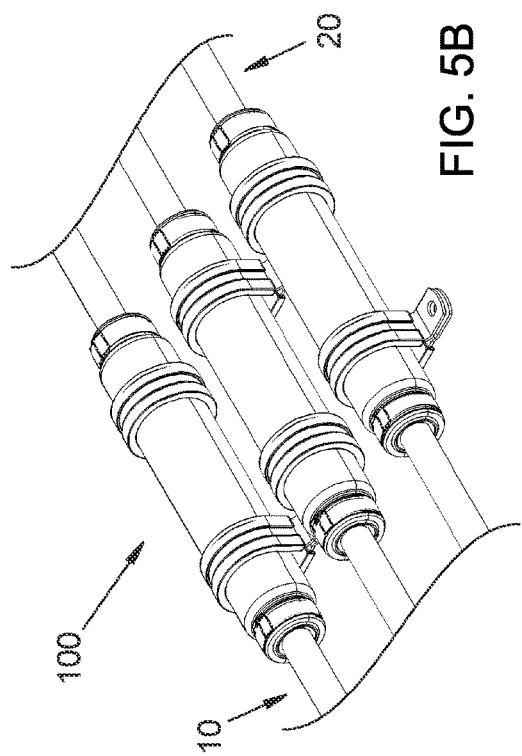
FIGS. 5A through 5D illustrate schematically various mounting arrangements for multiple example inventive electrical connectors.
Figure 5B:
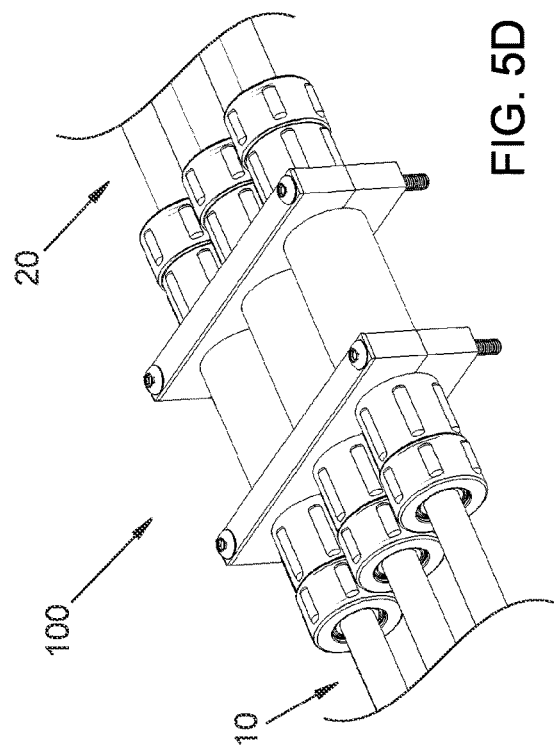
Figure 5C:
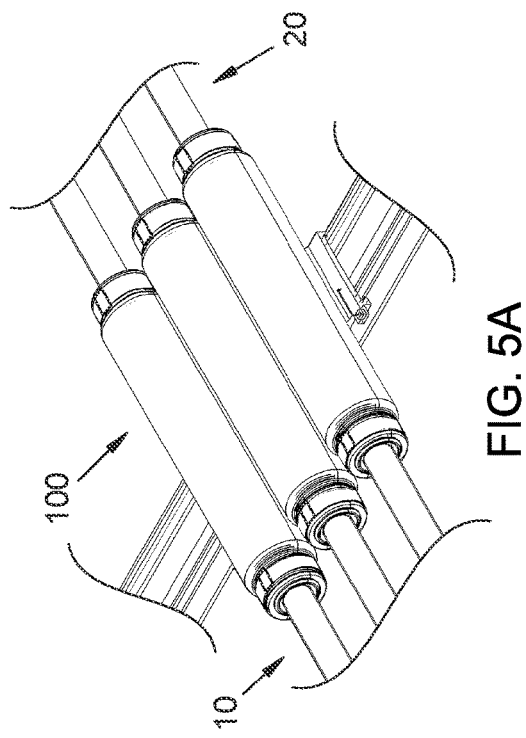
Figure 5D:
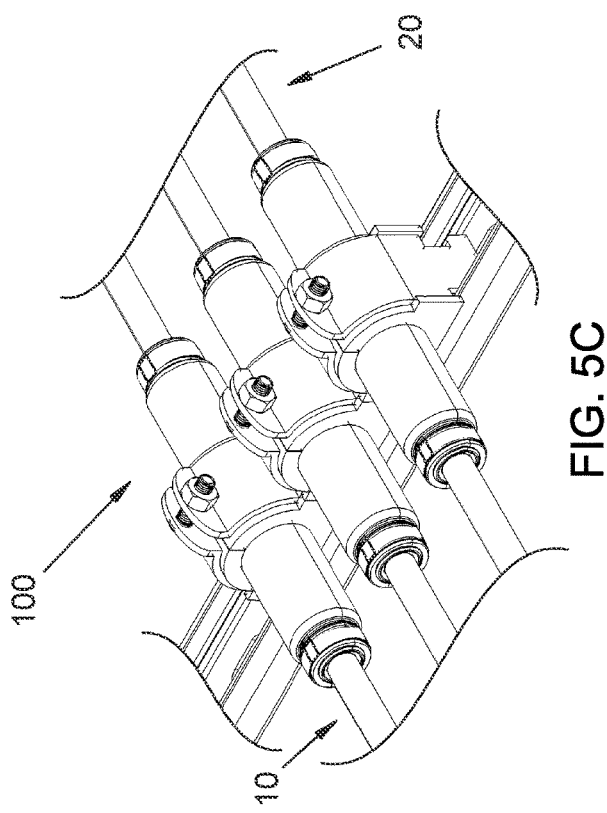

In conventional connector arrangements that include a terminal lug on each wire connected to a common terminal stud on a terminal strip, one or more terminal studs are mounted on an insulating block, which is in turn attached to some suitably located structural member, e.g., a beam, joist, wall stud, post, strut, DIN rail, and so forth. An inventive connector assembly 100 can be secured to a structural member by attaching the outer sleeve 140 to the structural member. Accordingly, in some examples an inventive connector assembly 100 can include mounting hardware structurally arranged for attaching the outer sleeve 140 to a structural member. In some examples the mounting hardware can include one or more of: one or more DIN rail mounting brackets (e.g., as in the example of FIG. 5A); one or more P-clamps or U-clamps (e.g., as in the example of FIG. 5B); one or more strut clamps (e.g., as in the example of FIG. 5C); or one or more array mounting blocks (e.g., as in the example of FIG. 5D); other suitable mounting hardware can be employed.

An inventive method for connecting first and second insulated electrical wires 10/20 end-to-end, using an inventive connector assembly 100 as described above, includes (A) with the male and female contacts 110/120 attached to corresponding conductors 11/21 protruding from the insulation 12/22 of the wires 10/20, assembling the contacts 110/120 by inserting the pin 114 into the receptacle 124, thereby engaging the pin 114 with the receptacle 124 and establishing electrical continuity between them and the wires 10/20; (B) positioning the assembled contacts 110/120 within the inner sleeve 130; (C) positioning the inner sleeve 130, and the assembled contacts 110/120 positioned within the inner sleeve 130, within the outer sleeve 140; and (D) at the ends of the outer sleeve 140, compressing the ends of the inner sleeve 130 to frictionally engage the inner sleeve 130 with the first and second wires 10/20. In some examples, the contact 110/120 are already attached to the conductors 11/21 or the wires 10/20. In some other examples, the inventive method can further include, before part (A), one or both of (i) attaching the rearward portion 112 of the male contact 110 to the electrical conductor 11 of the first wire 10 protruding from its insulation 12; or (ii) attaching the rearward portion 122 of the female contact 120 to an electrical conductor 21 of the second wire 20 protruding from its insulation 22.

The connector assembly 100 joining wires 10/20 can be disassembled to disconnect the wires 10/20. According, an inventive method can include (A) disengaging the ends of the outer sleeve 140 from the inner sleeve 130, thereby disengaging the ends of the inner sleeve 130 from the wires 10/20; (B) removing the inner sleeve 130, and the assembled contacts 110/120 positioned therein, from the outer sleeve 140; (C) removing the assembled contacts 110/102 from the inner sleeve 130; and (D) removing the pin 114 from the receptacle 124, thereby disassembling the contacts 110/120 and disconnecting the wires 10/20.

In examples wherein the connector assembly 100 includes an inner band 118, an inventive method can further include, after part (A) and before part (B), compressing the receptacle 124 against the pin 114 within the receptacle 124 using the tensioned inner band 118 around the receptacle 124. In examples wherein the inner sleeve 130 comprises a single, unitary, tubular member having a single longitudinal slice, part (B) of the inventive method can include lateral insertion of the assembled contacts 110/120 into the inner sleeve 130 through the slice. In examples wherein the outer sleeve 140 includes a tubular member divided into two separate, opposing longitudinal segments, part (C) of the inventive method can include assembling the two segments around the inner sleeve 130, and the assembled contacts 110/120 positioned within the inner sleeve, to form the outer sleeve 140. In examples wherein the connector assembly 100 includes the outer bands 148, part (D) of an inventive method can include positioning the tensioned outer bands 148 around the ends of the outer sleeve 140 to compress the ends of the inner sleeve 130 and frictionally engage the inner sleeve 130 with the wires 10/20. In examples wherein the outer sleeve 140 includes external threads 145 at its ends, and the connector assembly 100 includes threaded nuts 146 and compression glands 147, part (D) can include positioning the glands 147 against the ends of the inner sleeve 130, engaging the nuts 146 with the threads 145, and, with the wires 10/20 passing through the nuts 146 and the glands 147, tightening the nuts 146 to urge the glands 147 against the inner sleeve 130, compress the ends of the inner sleeve 130, and frictionally engage the inner sleeve 130 with the wires 10/20. In examples wherein the connector assembly includes mounting hardware, an inventive method can include mounting the outer sleeve, with the inner sleeve 130 and the assembled contacts 110/120 positioned therein, to a structural member using mounting hardware.

In addition to the preceding, the following example embodiments fall within the scope of the present disclosure or appended claims:

Example 1. An electrical connector assembly for connecting an end of a first insulated electrical wire to an end of a second insulated electrical wire, the connector assembly comprising: (a) an electrically conductive male contact that includes (i) a rearward wire-engaging portion structurally arranged to be attached to an electrical conductor of the first wire protruding from insulation at the end of the first wire, and (ii) a forward portion including an elongated pin; (b) an electrically conductive female contact that includes (i) a rearward wire-engaging portion structurally arranged to be attached to an electrical conductor of the second wire protruding from insulation at the end of the second wire, and (ii) a forward portion including an elongated receptacle structurally arranged for assembly with the male contact by receiving therein, mechanically engaging, and establishing electrical continuity with, the pin; (c) an electrically insulating, compressible inner sleeve that includes a longitudinal passage therethrough and is structurally arranged (i) for enclosing circumferentially the assembled male and female contacts, and (ii) for extending, with the assembled male and female contacts positioned therein, in both longitudinal directions beyond the respective rearward portions of the assembled male and female contacts; and (d) an electrically insulating, substantially rigid outer sleeve that includes a longitudinal passage therethrough and is structurally arranged (i) for enclosing circumferentially the inner sleeve and the assembled male and female contacts positioned within the inner sleeve, and (ii) for extending, with the inner sleeve and the assembled male and female contacts positioned therein, in both longitudinal directions at least as far as the inner sleeve, (e) wherein the outer sleeve is structurally arranged (i) at a first end thereof to compress a first end of the inner sleeve so as to frictionally engage the inner sleeve with the first wire, and (i) at a second end thereof to compress a second end of the inner sleeve so as to frictionally engage the inner sleeve with the second wire.

Example 2. The apparatus of Example 1 wherein: (a') the rearward portion of the male contact is attached to the conductor of the first wire protruding from insulation at the end of the first wire; (b') the rearward portion of the female contact is attached to the conductor of the second wire protruding from insulation at the end of the second wire, and the male and female contacts are assembled with the pin received within and mechanically engaged with the receptacle, thereby establishing electrical continuity between the assembled male and female contacts; (c') the assembled male and female contacts are positioned within the inner sleeve; (d') the inner sleeve and the assembled male and female contacts are positioned within the outer sleeve; and (e') the outer sleeve compresses the inner sleeve so as to frictionally engage the first and second ends of the inner sleeve with the first and second wires, respectively.

Example 3. The apparatus of any one of Examples 1 or 2 wherein engagement of the first end of the inner sleeve with the first wire and engagement of the second end of the inner sleeve with the second wire isolates the assembled male and female contacts from a use environment.

Example 4. The apparatus of any one of Examples 1 through 3 wherein the male and female contacts are structurally arranged so as to enable, with the pin received within and mechanically engaged with the receptacle, relative rotation of the male and female contacts about a longitudinal axis.

Example 5. The apparatus of any one of Examples 1 through 4 wherein one or both of the pin or the receptacle are structurally arranged so as to retain the pin within the receptacle at any one of multiple relative longitudinal positions of the male and female contacts.

Example 6. The apparatus of Example 5 wherein: (i) the pin includes multiple circumferential grooves on an outer circumferential surface thereof spaced longitudinally from one another along the pin; (ii) the receptacle includes a circumferential ridge extending radially inward within the receptacle, the ridge being arranged so as to engage any one of the circumferential grooves of the pin with the pin within the receptacle; and (iii) the receptacle is elastically deformable and structurally arranged so as to urge the ridge into engagement with a suitably aligned one of the grooves, frictionally engage the pin with the ridge thus engaged, and permit the ridge to disengage from the groove and slide along the pin as the pin moves longitudinally within the receptacle.

Example 7. The apparatus of any one of Examples 1 through 6 further comprising an inner band arranged for being positioned around the receptacle and, under tension and with the male and female contacts assembled together, compressing the receptacle against the pin.

Example 8. The apparatus of any one of Examples 1 through 7 wherein one or both of the male or female contacts include one or more metals or metal alloys.

Example 9. The apparatus of Example 8 wherein one or both of the male or female contacts include copper or aluminum.

Example 10. The apparatus of any one of Examples 1 through 9 wherein the inner sleeve includes one or more polymeric materials.

Example 11. The apparatus of Example 10 wherein the inner sleeve includes one or more materials among silicone or fluorosilicone polymers, polytetrafluoroethylene polymers, polyethylene polymers, polyethylene terephthalate polymers, or ethylene propylene diene monomer rubbers.

Example 12. The apparatus of any one of Examples 10 or 11 wherein the inner sleeve includes Duralectric™ material.

Example 13. The apparatus of any one of Examples 1 through 12 wherein the inner sleeve includes one or more materials resistant to one or more aviation fluids.

Example 14. The apparatus of any one of Examples 1 through 13 wherein the inner sleeve comprises a single, unitary, tubular member having a single longitudinal slice extending the entire length of the inner sleeve arranged so as to enable lateral insertion of the assembled male and female contacts into the inner sleeve through the slice.

Example 15. The apparatus of Example 14 wherein the inner sleeve includes a self-healing polymeric material so that, with the assembled male and female contacts positioned within the inner sleeve, opposing surfaces of the slice are joined by self-healing of the polymeric material.

Example 16. The apparatus of any one of Examples 1 through 13 wherein the inner sleeve comprises a tubular member divided into two separate, opposing longitudinal segments so as to enable assembly of the two segments around the assembled male and female contacts to form the inner sleeve.

Example 17. The apparatus of Example 16 wherein the inner sleeve includes a self-healing polymeric material so that, with the assembled male and female contacts positioned within the inner sleeve, opposing surfaces of the two segments are joined by self-healing of the polymeric material.

Example 18. The apparatus of any one of Examples 1 through 17 wherein the inner sleeve includes a plurality of circumferential flanges extending radially inward so as to engage the assembled male and female contacts positioned within the inner sleeve.

Example 19. The apparatus of any one of Examples 1 through 18 wherein an outer surface of the inner sleeve is tapered at each end of the inner sleeve.

Example 20. The apparatus of any one of Examples 1 through 19 wherein the outer sleeve includes a unitary tubular member.

Example 21. The apparatus of any one of Examples 1 through 19 wherein the outer sleeve includes a tubular member divided into two separate, opposing longitudinal segments so as to enable assembly of the two segments around inner sleeve, and the assembled male and female contacts positioned within the inner sleeve, to form the outer sleeve.

Example 22. The apparatus of Example 21 further comprising: (i) a first tensioned outer band around a first end of the outer sleeve, the first outer band being arranged for securing together the two longitudinal segments and compressing the first end of the inner sleeve so as to frictionally engage the inner sleeve with the first wire; and (ii) a second tensioned outer band around a second end of the outer sleeve, the second outer band arranged for securing together the two longitudinal segments and compressing the second end of the inner sleeve so as to frictionally engage the inner sleeve with the second wire.

Example 23. The apparatus of any one of Examples 1 through 21 wherein the outer sleeve further includes: (i) external threads at opposite first and second ends of the outer sleeve; (ii) a first threaded nut and a first compression gland, the first gland being positioned with the first wire therethrough against a first end of the inner sleeve, the first nut being threadedly engaged, with the first wire therethrough, with the external threads of the first end of the outer sleeve, the first nut and gland being structurally arranged so that tightening the first nut urges the first gland against the inner sleeve and compresses the first end of the inner sleeve so as to frictionally engage the inner sleeve with the first wire; and (iii) a second threaded nut and a second compression gland, the second being positioned with the second wire therethrough against a second end of the inner sleeve, the second nut being threadedly engaged, with the second wire therethrough, with the external threads of the second end of the outer sleeve, the second nut and gland being structurally arranged so that tightening the second nut urges the second gland against the inner sleeve and compresses the second end of the inner sleeve so as to frictionally engage the inner sleeve with the second wire.

Example 24. The apparatus of any one of Examples 1 through 20 wherein the outer sleeve further includes: (i) a first tensioned outer band around a first end of the outer sleeve, the first outer band being arranged for compressing the first end of the inner sleeve so as to frictionally engage the inner sleeve with the first wire; and (ii) a second tensioned outer band around a second end of the outer sleeve, the second outer band arranged for compressing the second end of the inner sleeve so as to frictionally engage the inner sleeve with the second wire.

Example 25. The apparatus of any one of Examples 1 through 24 wherein the outer sleeve includes one or more polymeric materials.

Example 26. The apparatus of Example 25 wherein the outer sleeve includes one or materials among silicone or fluorosilicone polymers, polytetrafluoroethylene polymers, polyethylene polymers, polyethylene terephthalate polymers, polyether ether ketone polymers, polyetherketone polymers, other polyaryletherketone polymers, polyethylenimine polymers, or polyphenylene sulfide polymers.

Example 27. The apparatus of any one of Examples 25 or 26 wherein the outer sleeve includes PEEK material.

Example 28. The apparatus of any one of Examples 1 through 27 wherein the outer sleeve includes one or more materials resistant to one or more aviation fluids.

Example 29. The apparatus of any one of Examples 1 through 28 further comprising mounting hardware structurally arranged for attaching the outer sleeve to a structural member.

Example 30. The apparatus of Example 29 wherein the mounting hardware includes one or more of: one or more DIN rail mounting brackets; one or more strut clamps; one or more P-clamps or U-clamps; or one or more array mounting blocks.

Example 31. The apparatus of any one of Examples 1 through 30 wherein the connector assembly is arranged to connect the first and second wires so as to enable electrical power transmission from an aircraft electrical generator to an aircraft electrical power distribution network, or within an aircraft electrical power distribution network.

Example 32. A method for connecting an end of a first insulated electrical wire to an end of a second insulated electrical wire using the apparatus of any one of Examples 1 through 31, the method comprising: (A) with the male contact attached to an electrical conductor of the first wire protruding from insulation at the end of the first wire, and with the female contact attached to an electrical conductor of the second wire protruding from insulation at the end of the second wire, assembling the male and female contacts by inserting the pin into the receptacle, thereby engaging the pin with the receptacle and establishing electrical continuity between the pin and the receptacle; (B) positioning the assembled male and female contacts within the inner sleeve; (C) positioning the inner sleeve, and the assembled male and female contacts positioned therein, within the outer sleeve; and (D) at the first and second ends of the outer sleeve, compressing the first and second ends of the inner sleeve, respectively, to frictionally engage the inner sleeve with the first and second wires, respectively.

Example 33. The method of Example 32 further comprising, before part (A), one or both of (i) attaching the rearward portion of the male contact to the conductor of the first wire protruding from insulation at the end of the first wire, or (ii)

attaching the rearward portion of the female contact to the conductor of the second wire protruding from insulation at the end of the second wire.

Example 34. The method of any one of Examples 32 or 33 further comprising, after part (A) and before part (B), compressing the receptacle against the pin within the receptacle using a tensioned inner band around the receptacle.

Example 35. The method of any one of Examples 32 through 34 wherein the inner sleeve comprises a single, unitary, tubular member having a single longitudinal slice extending the entire length of the inner sleeve, and part (B) includes lateral insertion of the assembled male and female contacts into the inner sleeve through the slice.

Example 36. The method of any one of Examples 32 through 35 wherein the outer sleeve comprises a tubular member divided into two separate, opposing longitudinal segments so as to enable assembly of the two segments around inner sleeve, and part (C) includes assembling the two segments around the inner sleeve, and the assembled male and female contacts positioned within the inner sleeve, to form the outer sleeve.

Example 37. The method of any one of Examples 32 through 36 wherein: (i) the outer sleeve includes external threads at opposite first and second ends thereof; (ii) part (D) includes positioning a first compression gland against a first end of the inner sleeve with the first wire therethrough, threadedly engaging a first threaded nut, with the first wire therethrough, with the external threads of the first end of the outer sleeve, and tightening the first nut so as to urge the first gland against the inner sleeve, compress the first end of the inner sleeve, and frictionally engage the inner sleeve with the first wire; and (iii) part (D) includes positioning a second compression gland against a second end of the inner sleeve with the second wire therethrough, threadedly engaging a second threaded nut, with the second wire therethrough, with the external threads of the second end of the outer sleeve, and tightening the second nut so as to urge the second gland against the inner sleeve, compress the second end of the inner sleeve, and frictionally engage the inner sleeve with the second wire.

Example 38. The method of any one of Examples 32 through 36 wherein: (i) part (D) includes positioning a first tensioned outer band around a first end of the outer sleeve to compress the first end of the inner sleeve and frictionally engage the inner sleeve with the first wire; and (ii) part (D) includes positioning a second tensioned outer band around a second end of the outer sleeve to compress the second end of the inner sleeve and frictionally engage the inner sleeve with the second wire.

Example 39. The method of any one of Examples 32 through 38 further comprising attaching the outer sleeve, with the inner sleeve and the assembled male and female contacts positioned therein, to a structural member using mounting hardware, the mounting hardware including one or more of: one or more DIN rail mounting brackets; one or more strut clamps; one or more P-clamps or U-clamps; or one or more array mounting blocks.

Example 40. A method for disconnecting first and second insulated conductive wires connected end-to-end by the apparatus of any one of Examples 1 through 31, the method comprising: (A) disengaging the first and second ends of the outer sleeve from the inner sleeve, thereby disengaging the first and second ends of the inner sleeve from the first and second wires, respectively; (B) removing the inner sleeve, and the assembled male and female contacts positioned therein, from the outer sleeve; (C) removing the assembled male and female contacts from the inner sleeve; and (D) removing the pin from the receptacle, thereby disassembling the male and female contacts.

Example 41. The method of any one of Examples 32 through 40 wherein connecting the first and second wires with the connector assembly enables electrical power transmission from an aircraft electrical generator to an aircraft electrical power distribution network, or within an aircraft electrical power distribution network.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. Similarly, "one or more of a dog or a cat" or "one or more dogs or cats" would be interpreted as including (i) one or more dogs without any cats, (ii) one or more cats without any dogs, or (iii) one or more dogs and one or more cats, unless explicitly stated otherwise or the alternatives are understood or disclosed (implicitly or explicitly) to be mutually exclusive or incompatible. Similarly, "one or more of a dog, a cat, or a mouse" or "one or more dogs, cats, or mice" would be interpreted as (i) one or more dogs without any cats or mice, (ii) one or more cats without and dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. "Two or more of a dog, a cat, or a mouse" or "two or more dogs, cats, or mice" would be interpreted as (i) one or more dogs and one or more cats without any mice, (ii) one or more dogs and one or more mice without any cats, (iii) one or more cats and one or more mice without and dogs, or (iv) one or more dogs, one or more cats, and one or more mice; "three or more," "four or more," and so on would be analogously interpreted. For any of the preceding recitations, if any pairs or combinations of the included alternatives are understood or disclosed (implicitly or explicitly) to be incompatible or mutually exclusive, such pairs or combinations are understood to be excluded from the corresponding recitation. For purposes of the present disclosure and appended claims, the words "comprising," "including," "having," and variants thereof, wherever they appear, shall be construed as open ended terminology, with the same meaning as if a phrase such as "at least" were appended after each instance thereof, unless explicitly stated otherwise.

For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An electrical connector assembly for connecting an end of a first insulated electrical wire to an end of a second insulated electrical wire, the connector assembly comprising:
   (a) an electrically conductive male contact that includes (i) a rearward wire-engaging portion structurally arranged to be attached to an electrical conductor of the first wire protruding from insulation at the end of the first wire, and (ii) a forward portion including an elongated pin;
   (b) an electrically conductive female contact that includes (i) a rearward wire-engaging portion structurally arranged to be attached to an electrical conductor of the second wire protruding from insulation at the end of the second wire, and (ii) a forward portion including an elongated receptacle structurally arranged for assembly with the male contact by receiving therein, mechanically engaging, and establishing electrical continuity with, the pin;
   (c) an electrically insulating, compressible inner sleeve that includes a longitudinal passage therethrough and is structurally arranged (i) for enclosing circumferentially the assembled male and female contacts, and (ii) for extending, with the assembled male and female contacts positioned therein, in both longitudinal directions beyond the respective rearward portions of the assembled male and female contacts; and
   (d) an electrically insulating, substantially rigid outer sleeve that includes a longitudinal passage therethrough and is structurally arranged (i) for enclosing circumferentially the inner sleeve and the assembled male and female contacts positioned within the inner sleeve, and (ii) for extending, with the inner sleeve and the assembled male and female contacts positioned therein, in both longitudinal directions at least as far as the inner sleeve,
   (e) wherein the outer sleeve is structurally arranged (i) at a first end thereof to compress a first end of the inner sleeve so as to frictionally engage the inner sleeve with the first wire, and (i) at a second end thereof to compress a second end of the inner sleeve so as to frictionally engage the inner sleeve with the second wire.

2. The apparatus of claim 1 wherein:
   (a') the rearward portion of the male contact is attached to the conductor of the first wire protruding from insulation at the end of the first wire;
   (b') the rearward portion of the female contact is attached to the conductor of the second wire protruding from insulation at the end of the second wire, and the male and female contacts are assembled with the pin received within and mechanically engaged with the receptacle, thereby establishing electrical continuity between the assembled male and female contacts;
   (c') the assembled male and female contacts are positioned within the inner sleeve;

(d') the inner sleeve and the assembled male and female contacts are positioned within the outer sleeve; and (e') the outer sleeve compresses the inner sleeve so as to frictionally engage the first and second ends of the inner sleeve with the first and second wires, respectively.

3. The apparatus of claim 1 wherein engagement of the first end of the inner sleeve with the first wire and engagement of the second end of the inner sleeve with the second wire isolates the assembled male and female contacts from a use environment.

4. The apparatus of claim 1 wherein the male and female contacts are structurally arranged so as to enable, with the pin received within and mechanically engaged with the receptacle, relative rotation of the male and female contacts about a longitudinal axis.

5. The apparatus of claim 1 further comprising an inner band arranged for being positioned around the receptacle and, under tension and with the male and female contacts assembled together, compressing the receptacle against the pin.

6. The apparatus of claim 1 wherein (i) the inner sleeve includes one or more polymeric materials, or (ii) the outer sleeve includes one or more polymeric materials.

7. The apparatus of claim 1 wherein (i) the inner sleeve includes Duralectric™ material, and (ii) the outer sleeve includes PEEK material.

8. The apparatus of claim 1 wherein (i) the inner sleeve includes one or more materials resistant to one or more aviation fluids, or (ii) the outer sleeve includes one or more materials resistant to one or more aviation fluids.

9. The apparatus of claim 1 wherein the inner sleeve includes a plurality of circumferential flanges extending radially inward so as to engage the assembled male and female contacts positioned within the inner sleeve.

10. The apparatus of claim 1 wherein an outer surface of the inner sleeve is tapered at each end of the inner sleeve.

11. The apparatus of claim 1 wherein the outer sleeve includes a unitary tubular member.

12. The apparatus of claim 1 wherein the outer sleeve further includes:

(i) external threads at opposite first and second ends of the outer sleeve;

(ii) a first threaded nut and a first compression gland, the first gland being positioned with the first wire therethrough against a first end of the inner sleeve, the first nut being threadedly engaged, with the first wire therethrough, with the external threads of the first end of the outer sleeve, the first nut and gland being structurally arranged so that tightening the first nut urges the first gland against the inner sleeve and compresses the first end of the inner sleeve so as to frictionally engage the inner sleeve with the first wire; and (iii) a second threaded nut and a second compression gland, the second gland being positioned with the second wire therethrough against a second end of the inner sleeve, the second nut being threadedly engaged, with the second wire therethrough, with the external threads of the second end of the outer sleeve, the second nut and gland being structurally arranged so that tightening the second nut urges the second gland against the inner sleeve and compresses the second end of the inner sleeve so as to frictionally engage the inner sleeve with the second wire.

13. The apparatus of claim 1 wherein the outer sleeve further includes:

(i) a first tensioned outer band around a first end of the outer sleeve, the first outer band being arranged for compressing the first end of the inner sleeve so as to frictionally engage the inner sleeve with the first wire; and (ii) a second tensioned outer band around a second end of the outer sleeve, the second outer band arranged for compressing the second end of the inner sleeve so as to frictionally engage the inner sleeve with the second wire.

14. The apparatus of claim 1 further comprising mounting hardware structurally arranged for attaching the outer sleeve to a structural member.

15. The apparatus of claim 1 wherein one or both of the pin or the receptacle are structurally arranged so as to retain the pin within the receptacle at any one of multiple relative longitudinal positions of the male and female contacts.

16. The apparatus of claim 15 wherein:

(i) the pin includes multiple circumferential grooves on an outer circumferential surface thereof spaced longitudinally from one another along the pin;

(ii) the receptacle includes a circumferential ridge extending radially inward within the receptacle, the ridge being arranged so as to engage any one of the circumferential grooves of the pin with the pin within the receptacle; and (iii) the receptacle is elastically deformable and structurally arranged so as to urge the ridge into engagement with a suitably aligned one of the grooves, frictionally engage the pin with the ridge thus engaged, and permit the ridge to disengage from the groove and slide along the pin as the pin moves longitudinally within the receptacle.

17. The apparatus of claim 1 wherein the inner sleeve comprises a single, unitary, tubular member having a single longitudinal slice extending the entire length of the inner sleeve arranged so as to enable lateral insertion of the assembled male and female contacts into the inner sleeve through the slice.

18. The apparatus of claim 17 wherein the inner sleeve includes a self-healing polymeric material so that, with the assembled male and female contacts positioned within the inner sleeve, opposing surfaces of the slice are joined by self-healing of the polymeric material.

19. The apparatus of claim 1 wherein the inner sleeve comprises a tubular member divided into two separate, opposing longitudinal segments so as to enable assembly of the two segments around the assembled male and female contacts to form the inner sleeve.

20. The apparatus of claim 19 wherein the inner sleeve includes a self-healing polymeric material so that, with the assembled male and female contacts positioned within the inner sleeve, opposing surfaces of the two segments are joined by self-healing of the polymeric material.

21. The apparatus of claim 1 wherein the outer sleeve includes a tubular member divided into two separate, opposing longitudinal segments so as to enable assembly of the two segments around inner sleeve, and the assembled male and female contacts positioned within the inner sleeve, to form the outer sleeve.

22. The apparatus of claim 21 further comprising:

(i) a first tensioned outer band around a first end of the outer sleeve, the first outer band being arranged for securing together the two longitudinal segments and compressing the first end of the inner sleeve so as to frictionally engage the inner sleeve with the first wire; and (ii) a second tensioned outer band around a second end of the outer sleeve, the second outer band arranged for securing together the two longitudinal segments and compressing the second end of the inner sleeve so as to frictionally engage the inner sleeve with the second wire.

23. A method for connecting an end of a first insulated electrical wire to an end of a second insulated electrical wire using an electrical connector assembly, wherein the electrical connector assembly comprises:

(a) an electrically conductive male contact that includes (i) a rearward wire-engaging portion structurally arranged to be attached to an electrical conductor of the first wire protruding from insulation at the end of the first wire, and (ii) a forward portion including an elongated pin;

(b) an electrically conductive female contact that includes (i) a rearward wire-engaging portion structurally arranged to be attached to an electrical conductor of the second wire protruding from insulation at the end of the second wire, and (ii) a forward portion including an elongated receptacle structurally arranged for assembly with the male contact by receiving therein, mechanically engaging, and establishing electrical continuity with, the pin;

(c) an electrically insulating, compressible inner sleeve that includes a longitudinal passage therethrough and is structurally arranged (i) for enclosing circumferentially the assembled male and female contacts, and (ii) for extending, with the assembled male and female contacts positioned therein, in both longitudinal directions beyond the respective rearward portions of the assembled male and female contacts; and (d) an electrically insulating, substantially rigid outer sleeve that includes a longitudinal passage therethrough and is structurally arranged (i) for enclosing circumferentially the inner sleeve and the assembled male and female contacts positioned within the inner sleeve, and (ii) for extending, with the inner sleeve and the assembled male and female contacts positioned therein, in both longitudinal directions at least as far as the inner sleeve, (e) the outer sleeve being structurally arranged (i) at a first end thereof to compress a first end of the inner sleeve so as to frictionally engage the inner sleeve with the first wire, and (i) at a second end thereof to compress a second end of the inner sleeve so as to frictionally engage the inner sleeve with the second wire, the method comprising:

(A) with the male contact attached to an electrical conductor of the first wire protruding from insulation at the end of the first wire, and with the female contact attached to an electrical conductor of the second wire protruding from insulation at the end of the second wire, assembling the male and female contacts by inserting the pin into the receptacle, thereby engaging the pin with the receptacle and establishing electrical continuity between the pin and the receptacle;

(B) positioning the assembled male and female contacts within the inner sleeve;

(C) positioning the inner sleeve, and the assembled male and female contacts positioned therein, within the outer sleeve; and (D) at the first and second ends of the outer sleeve, compressing the first and second ends of the inner sleeve, respectively, to frictionally engage the inner sleeve with the first and second wires, respectively.

24. The method of claim 23 further comprising, before part (A), one or both of (i) attaching the rearward portion of the male contact to the conductor of the first wire protruding from insulation at the end of the first wire, or (ii) attaching the rearward portion of the female contact to the conductor of the second wire protruding from insulation at the end of the second wire.

25. The method of claim 23 further comprising attaching the outer sleeve, with the inner sleeve and the assembled male and female contacts positioned therein, to a structural member using mounting hardware, the mounting hardware including one or more of: one or more DIN rail mounting brackets; one or more strut clamps; one or more P-clamps or U-clamps; or one or more array mounting blocks.

26. The method of claim 23 wherein connecting the first and second wires with the connector assembly enables electrical power transmission from an aircraft electrical generator to an aircraft electrical power distribution network, or within an aircraft electrical power distribution network.

27. A method for disconnecting first and second insulated conductive wires connected end-to-end by an electrical connector assembly, wherein the electrical connector assembly comprises:

(a) an electrically conductive male contact that includes (i) a rearward wire-engaging portion structurally arranged to be attached to an electrical conductor of the first wire protruding from insulation at the end of the first wire, and (ii) a forward portion including an elongated pin;

(b) an electrically conductive female contact that includes (i) a rearward wire-engaging portion structurally arranged to be attached to an electrical conductor of the second wire protruding from insulation at the end of the second wire, and (ii) a forward portion including an elongated receptacle structurally arranged for assembly with the male contact by receiving therein, mechanically engaging, and establishing electrical continuity with, the pin;

(c) an electrically insulating, compressible inner sleeve that includes a longitudinal passage therethrough and is structurally arranged (i) for enclosing circumferentially the assembled male and female contacts, and (ii) for extending, with the assembled male and female contacts positioned therein, in both longitudinal directions beyond the respective rearward portions of the assembled male and female contacts; and (d) an electrically insulating, substantially rigid outer sleeve that includes a longitudinal passage therethrough and is structurally arranged (i) for enclosing circumferentially the inner sleeve and the assembled male and female contacts positioned within the inner sleeve, and (ii) for extending, with the inner sleeve and the assembled male and female contacts positioned therein, in both longitudinal directions at least as far as the inner sleeve, (e) the outer sleeve being structurally arranged (i) at a first end thereof to compress a first end of the inner sleeve so as to frictionally engage the inner sleeve with the first wire, and (i) at a second end thereof to compress a second end of the inner sleeve so as to frictionally engage the inner sleeve with the second wire, the method comprising:

(A) disengaging the first and second ends of the outer sleeve from the inner sleeve, thereby disengaging the first and second ends of the inner sleeve from the first and second wires, respectively;

(B) removing the inner sleeve, and the assembled male and female contacts positioned therein, from the outer sleeve;

(C) removing the assembled male and female contacts from the inner sleeve; and (D) removing the pin from the receptacle, thereby disassembling the male and female contacts.

* * * * *